United States Patent [19]
Peace et al.

[11] Patent Number: 5,877,430
[45] Date of Patent: Mar. 2, 1999

[54] PRESSURE MEASURING SYSTEM FOR GAS FLOW METER

[75] Inventors: Daniel W. Peace, Punxsutawney; Richard V. Woodward, DuBois, both of Pa.

[73] Assignee: M&FC Holding Company, Inc., Wilmington, Del.

[21] Appl. No.: 876,086

[22] Filed: Jun. 13, 1997

[51] Int. Cl.[6] .................................................. G01F 1/10
[52] U.S. Cl. ..................................... 73/861.82; 73/861.83
[58] Field of Search .......................... 73/861.81, 861.82, 73/861.83, 861.84, 861.89, 861.91, 861.92, 861.93, 861.94, 1.16, 1.27, 1.28

[56] References Cited

U.S. PATENT DOCUMENTS

| | | | |
|---|---|---|---|
| 2,859,616 | 11/1958 | Fellows | 73/195 |
| 3,053,086 | 9/1962 | Granberg | 73/861.84 |
| 3,060,740 | 10/1962 | Granberg | 73/861.84 |
| 3,135,116 | 6/1964 | Kwong et al. | 73/861.91 |
| 3,201,987 | 8/1965 | Ackerman | 73/861.79 |
| 3,241,366 | 3/1966 | Allen | 73/861.84 |
| 3,248,943 | 5/1966 | Francisco | 73/861.91 |
| 3,307,396 | 3/1967 | Griffo | 73/861.01 |
| 3,364,743 | 1/1968 | Clinton | 73/861.83 |
| 3,377,856 | 4/1968 | Hasegawa | 73/861.79 |
| 3,604,265 | 9/1971 | Wilson, Jr. | 73/861.352 |
| 3,623,835 | 11/1971 | Boyd | 73/861.92 |
| 3,695,106 | 10/1972 | Gelsow | 73/861.91 |
| 3,707,872 | 1/1973 | Masson et al. | 73/861.92 |
| 3,710,622 | 1/1973 | Hammond et al. | 73/861.84 |
| 3,735,637 | 5/1973 | Penet | 73/861.84 |
| 3,788,142 | 1/1974 | Goransson | 73/861.83 |
| 3,934,473 | 1/1976 | Griffo | 73/861.84 |
| 3,958,447 | 5/1976 | Baker et al. | 73/32 R |
| 4,067,230 | 1/1978 | Ball | 73/54.01 |
| 4,091,653 | 5/1978 | Lee | 73/81.28 |
| 4,286,471 | 9/1981 | Lee et al. | 73/861.84 |
| 4,305,281 | 12/1981 | Lee et al. | 73/195 |
| 4,463,613 | 8/1984 | Schmittner et al. | 73/861.83 |
| 4,534,226 | 8/1985 | Rose | 73/861.84 |
| 5,325,729 | 7/1994 | Goodson et al. | 73/861.91 |
| 5,473,932 | 12/1995 | Fitzpatrick et al. | 73/1.28 |
| 5,509,305 | 4/1996 | Husain et al. | 73/195 |
| 5,654,513 | 8/1997 | Bremer | 73/861.83 |

FOREIGN PATENT DOCUMENTS

| | | |
|---|---|---|
| 1288912 | 8/1962 | France . |
| 728 132 | 11/1942 | Germany . |
| 27 02 319 | 7/1978 | Germany . |
| 4-116420 | 4/1992 | Japan . |
| 2 002 856 A | 2/1979 | United Kingdom . |

*Primary Examiner*—Harshad Patel
*Attorney, Agent, or Firm*—Wood, Herron & Evans, L.L.P.

[57] ABSTRACT

A turbine gas flow meter (10) includes a meter body (12) including an inlet portion (24) having an inlet body (32) mounted therein, with an exit end (30) of the body inlet portion being defined at an internal plenum (22) of the meter body, and a removable turbine meter measuring module (44) including a rotor assembly (48) which is inserted into the plenum with an inlet end (127) of the rotor assembly and the exit end of the inlet portion defining an interface therebetween. A closed space (114) is formed about the rotor assembly within the plenum between an inner wall (106) of the body and outer walls (116, 118) of the rotor assembly. An axial gap (128) between a surface (130) of the rotor assembly inlet end and a surface (132) of the body inlet portion exit end, and/or radial notches in either of the surfaces (130, 132), provide fluid pressure communication from the interface to the closed space. A pressure tap (138) extends through the body into the closed space for measuring pressure within the closed space.

22 Claims, 2 Drawing Sheets

PRESSURE MEASURING SYSTEM FOR GAS FLOW METER

FIELD OF THE INVENTION

The present invention relates to turbine flow meters for measuring the flow volume of a gaseous medium through a pipe and, more particularly, to such a turbine flow meter including a system for accurately measuring the static pressure existing within the meter over a wide range of flow rates.

BACKGROUND OF THE INVENTION

Axial flow turbine meters are widely used for measuring flow of gas by which to determine gas usage and the like. To this end, an axial flow turbine meter includes a meter body having an inlet end connected to a gas supply line or pipe and an outlet end which may be connected to a gas delivery line or pipe. Inside the meter body at the inlet end is a cone or bullet-shaped inlet body, the exit end of which is placed adjacent to a turbine rotor assembly having at least first rotor which rotates in response to gas flowing thereover so as to provide a measure of the gas flow. A second rotor may be positioned downstream of the first rotor for more accurate or calibrating measurements. Blades on the rotor periphery cause the rotor to rotate. To focus the flowing gas on the blades, the inlet body conditions the flowing gas to change it from the space of the supply pipe to the annular path.

In order to provide reliable measurements, certain correction factors must be taken into account. In particular, the pressure and temperature of the gas passing through the meter are usually not equal to the standard pressure and temperature upon which gas suppliers base their pricing structure, and therefore the actual volume of gas indicated by the meter is corrected to standard conditions in order to determine the total price for the gas used.

It is desirable for a gas flow meter to measure flow volume with a high degree of accuracy, since flow volume errors of as little as a half a percent, occurring over a significant time period, can result in a substantial revenue error in the total gas usage. The gas supplier accordingly may significantly overcharge or undercharge the user. It will also be appreciated that a gas meter of a given design may be placed in a variety of types of installations whose usage rates may vary substantially from each other, and furthermore, there frequently is a significant variation in usage rates even for a particular installation as demand rises and falls in accordance with need. Thus, the goal for the designer of a gas flow meter is to design a meter which has a high degree of accuracy and repeatability over a wide range of flow rates.

In order to achieve accurate measurement of gas flow, it is standard practice to calibrate each meter by comparing the meter's indicated flow volume to a known flow volume and repeating this test over a range of flow rates so as to develop a "calibration curve" representing the meter's flow volume error in percent. One calibration method commonly used is to place the meter to be calibrated in series with a highly accurate flow measurement device such as a "flow prover" in a test line and to flow gas through the test line. At a given test point, the actual flow volumes of the test meter and the flow prover are acquired and each is corrected to standard conditions (e.g., 1 bar pressure and 15 degrees C.) based on measurements of the pressure and temperature of the gas entering the test meter and the pressure and temperature of the gas entering the flow prover. This test is repeated over a range of flow rates to arrive at the test meter's calibration curve. Using this curve, for any indicated flow rate, an accurate flow volume can be determined.

Thus, it will be appreciated that an accurate measurement of gas flow volume is highly dependent on accurate measurement of the pressure of the gas entering the meter, both at the time of meter calibration and at the time of usage. For instance, a pressure measurement error of one inch of water can translate into a 0.25 percent error in a meter's calibration curve.

During field use, one of the factors affecting the accuracy of a meter's calibration is variation in the configuration of the environment in which the meter is installed, from one installation to another. In one known turbine meter, the turbine rotor assembly and the inlet body form a complete or self-contained unit or module which is removable as a unit from the meter body for maintenance or calibration. The combined inlet body and rotor assembly are contained within a cylindrical sub-housing that is inserted axially into the meter body through the inlet end thereof. An annular pressure space is formed between the sub-housing and meter body radially outwardly of the inlet body. The pressure space is sealed from the rest of the meter so as to be confined over the inlet body and one or more apertures are formed in the sub-housing over the inlet body by which to permit pressure communication from the flow path over the inlet body to the pressure space. A sensor coupled to the pressure space may be used to obtain a readout of the pressure therein.

The plurality of apertures through the sub-housing require manufacturing time for machining, deburring, inspection, and testing. Moreover, in order to create the pressure space, the module must include the sub-housing. Thus, replacement of a bad rotor assembly results in disconnecting the gas line(s) from the meter body to remove the module and necessitates removal of the entire module, along with the inlet body, the latter being a component that is not prone to failure. The result is a less efficient and more costly system to build and maintain.

In other turbine gas meters, the inlet body is not part of the removable measuring module, but rather remains with the meter body, since it is a stationary part which is durable and seldom requires maintenance or replacement. For instance, in a prior meter design by the assignee of the present application, a measuring module including a separate turbine rotor assembly is removable from and insertable into an internal plenum within the body and adjacent to an exit end of the inlet body through a lateral opening in the body. The measuring module includes a main rotor which is carried within a generally cylindrical main rotor carrier and a sensing rotor which is carried within a generally cylindrical sensing rotor carrier, the two rotor carriers being connected to each other and to a top plate which covers the lateral opening in the body and supports a mechanical counter mechanism as well as connections for various sensors. To remove the module, the top plate is disconnected from the body, and the entire top plate and rotor assembly is removed, without having to disconnect the body from the gas supply line. The body includes an inlet body in the form of a nose cone with flow straightening vanes, but these remain with the body when the measuring module is removed.

With the stand-alone rotor assembly, calibration of the measuring module is performed independent of the inlet body and flow straightening vanes. Further, the measuring module can be removed from the body without disconnecting the body from the gas supply line. However, because the inlet body may have a substantial effect on the flow conditions, such as the static pressure, at the inlet to the measuring module, it is necessary to accurately measure and account for the static pressure during calibration and field use of the measuring module. To this end, pressure measured in the inlet flowpath above the inlet body is not a reliable or accurate source for calibration of the module since the module and inlet body are independent. Thus if a measuring module is calibrated in a test setup, the module may not be accurately calibrated for field use where the inlet body and other aspect of the meter body in the field may vary slightly from the test set-up unit. For example, the location of the sensor may vary from meter to meter or the size and spacing of the components may vary slightly from meter to meter. As a consequence, there is a marked risk of degraded repeatability and interchangeability of measuring modules from one meter body to another.

To overcome problems associated with measuring pressure over the inlet body, pressure measurements have been focused on the rotor turbine module assembly itself. To this end, pressure is measured at the inlet to the main rotor via a pressure tap machined through the main rotor carrier just upstream of the main rotor blades. The pressure tap is connected by flexible tubing to a fitting that extends through the top plate. A pressure sensor may be connected to the fitting. Thus, the pressure tap location is consistent from meter to meter and moves with the module. By measuring pressure close to the main rotor within the rotor assembly and making the pressure measurement system part of the removable measuring module, the same calibration curve can be used for the measuring module even when it is placed in different bodies.

This pressure measurement system has been found to be satisfactory up to gas flow velocities of about 110 feet per second. However, for reasons that are not known, it has been discovered that the accuracy of the pressure measured within the rotor assembly ahead of the main rotor begins to deteriorate at higher flow rates. For example, at 160 feet per second flow velocity, the meter calibration curve determined by using this pressure measurement is about 0.5 percent in error. Additionally, it has been found that pressure measurements taken over the inlet body exhibit inconsistencies with different measuring module/body combinations.

Accordingly, there has been a need for a pressure measurement system for a turbine flow meter module in which pressure can be accurately measured for a wide range of flow rates and which permits interchanging the meter in various meter bodies without having to recalibrate the meter each time it is placed in a new meter body.

SUMMARY OF THE INVENTION

The drawbacks noted above in connection with prior pressure measurement systems for a turbine flow meter are overcome in accordance with the principles of the present invention, by eliminating the apertures in the module housing and the pressure tube, and instead forming a closed space about the module that communicates to the front of the main rotor via a gap system formed between the module housing and the inlet portion of the meter body with a tap directly into the closed space over the module for measuring the pressure therein. By thus measuring pressure at the interface of the rotor module and the inlet portion of the body, it has been discovered that the pressure measurements are as accurate below 110 feet per second of gas flow rate as with prior techniques, and yet surprisingly achieve comparable accuracy at flow velocities well in excess of 110 feet per second. Such results are achieved without replacing the inlet body or matching up the module to the same inlet body for lab calibration and field use.

Advantageously, the gap system comprises an axial gap between the inlet end of the rotor assembly and the exit end of the body inlet portion. Additionally or alternatively, the gap system may comprise radial notches in the inlet end of the rotor assembly extending from the flowpath to the closed space. The radial notches are less susceptible to clogging by debris in the gas than the axial gap, so that fluid communication between the flowpath and the closed space is maintained over a longer period of use.

By virtue of the foregoing, there is thus provided a gas flow meter including a measuring module having a pressure measurement system that is integral to and calibrated along with the module, in which pressure may be accurately measured over a wide range of flow rates and in various meter bodies, thereby facilitating interchangeability, accuracy, and repeatability of the meter.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate an embodiment of the invention and, together with a general description of the invention given above, and the detailed description of the embodiment given below, serve to explain the principles of the invention.

DETAILED DESCRIPTION OF SPECIFIC EMBODIMENTS

Figure 1:
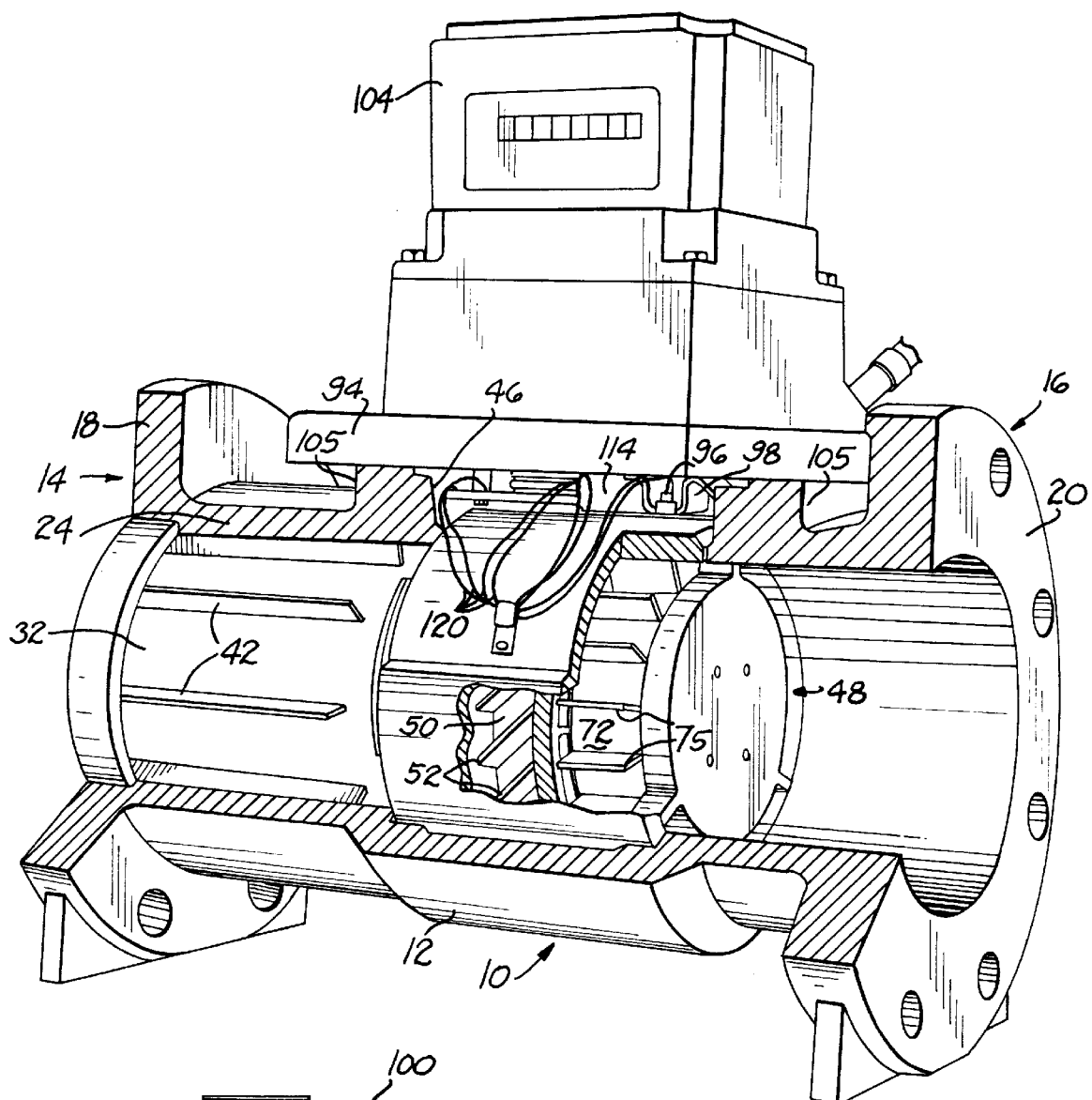
FIG. 1 is a perspective view of a turbine gas meter in accordance with the principles of the invention, partially cut away to show internal details of the meter.

With reference to FIG. 1, a turbine meter 10 in accordance with the principles of the present invention is shown. The meter 10 includes a body 12 having an entrance end 14 and a discharge end 16. In FIG. 1, the body 12 has been partially cut away to show internal details of the meter 10. The body 12 includes a flange 18 at the entrance end 14 which is adapted to be connected to a similar flange on a gas supply line (not shown), and similarly includes a flange 20 at the discharge end 16 which is adapted to be connected to a flange on a delivery line (not shown) which may lead to a device or pipeline to be supplied with gas.

Figure 2:
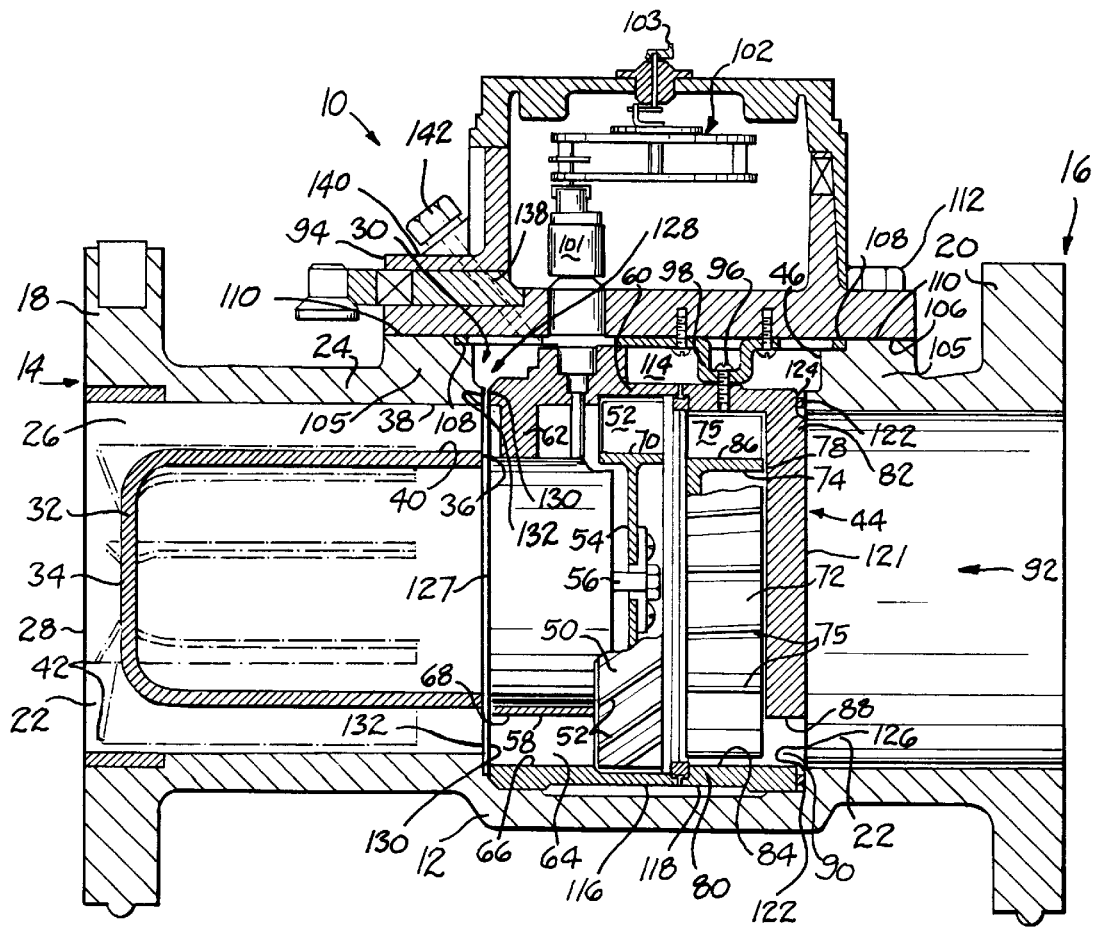
FIG. 2 is a view, partly in cross-section, of the turbine meter of FIG. 1, showing the axial gap when the measuring module is installed in the meter body.

With reference to FIGS. 1 and 2, the body 12 includes an internal plenum 22 between the entrance end 14 and the discharge end 16. The body has an inlet portion 24 which defines a gas flowpath 26 into the plenum 22. The inlet portion 24 has an inlet end 28 adjacent the entrance end 14 of the body 12 and an exit end 30 defined at the plenum 22.

The body further includes an inlet body 32 mounted within the inlet portion 24. The inlet body 32 comprises a nose cone having a closed end 34 adjacent the inlet end 28 of the body inlet portion 24 and an open end 36 defined at the exit end 30 of the body inlet portion 24. The inner wall 38 of the body inlet portion 24 and an outer wall 40 of the inlet body 32 define the annular gas flowpath 26. The inlet body 32 has a plurality of circumferentially spaced flow straightening vanes 42 extending outwardly from the outer wall 40. The vanes 42 engage the inner wall 38 of the inlet portion 24 so as to position the inlet body 32 within the inlet portion 24.

The meter 10 includes a turbine meter measuring module 44 which is insertable into the body 12 through a lateral opening 46 in the body 12. The measuring module 44 includes a rotor assembly 48. The details of the rotor assembly 48 itself are not necessary to an understanding of the principles of the present invention. It is sufficient to note that the rotor assembly 48 may be a dual turbine rotor assembly as shown, or alternatively may be a single rotor assembly. In the dual turbine assembly illustrated in the drawings, the rotor assembly 48 includes a main rotor 50 having a plurality of main rotor blades 52 mounted about a main rotor disc 54 which is supported on a shaft 56 rotatably journalled within a main rotor hub 58. The main rotor hub 58 is mounted concentrically within a main rotor carrier 60 which is generally cylindrical and is connected to the main rotor hub 58 by generally radial struts 62 in conventional manner. An annular flowpath 64 is thus defined between an inner surface 66 of the main rotor carrier 60 and an outer surface 68 of the main rotor hub 58 and an outer surface 70 of the main rotor disc 54, the main rotor blades 52 being disposed within this annular flowpath 64.

The rotor assembly 48 further includes a sensing rotor 72 located in close proximity downstream of the main rotor 50. The sensing rotor 72 includes a sensing rotor disc 74 about which are mounted a plurality of sensing rotor blades 75. The sensing rotor disc 74 is supported on a shaft (not shown) rotatably journalled in a sensing rotor hub 78. The hub 78 is mounted concentrically within a sensing rotor carrier 80 and connected thereto by generally radial struts 82. Thus, between an inner wall 84 of the sensing rotor carrier 80 and an outer wall 86 of the sensing rotor disc 74 and an outer wall 88 of the sensing rotor hub 78, an annular gas flowpath 90 is defined for the sensing rotor 72. The annular gas flowpath 90 of the sensing rotor is a continuation of the annular gas flowpath 64 of the main rotor 50, which is a continuation of the annular gas flowpath 26 of the body inlet portion 24. Gas exiting the annular flowpath 90 of the sensing rotor 72 discharges into a generally open region 92 in the body 12, and from there exits the body through the discharge end 16 thereof.

The measuring module 44 further includes a top plate 94 which is connected to the rotor assembly 48 via a hanger bolt 96 mounted on the sensing rotor carrier 80 and a hanger bracket 98 mounted on the top plate 94 and which is engaged by the hanger bolt 96, and a quick-connect adapter plate 100 connected to the main rotor carrier 60 which has openings (not shown) for engaging lugs (not shown) which project from the top plate 94. The top plate 94 serves to close the lateral opening 46 in the body 12 when the rotor assembly 48 is inserted into the body 12, and also supports a mechanical counter mechanism 104 which in known manner is connected via a mechanical output 103 and gear train 102, through a magnetic coupling 101, and through internal shafts and gearing (not shown) to the main rotor 50. An electronic pulse output (not shown) is supplied from a pulse generator (not shown) mounted on the main rotor shaft 56 to a gas flow computer (not shown) which computes the volume of gas which has passed through the meter, corrected to standard conditions of pressure and temperature. The top plate 94 also supports connectors (not shown) for outputs from other devices such as magnetic pickup devices (not shown) or optical counters (not shown). The body 12 includes raised mounting shoulders 105 framing the lateral opening 46 in facing relationship with an inner surface 106 of the top plate 94. To effect a sealing of the top plate 94 to the body 12, a seal 108 is disposed between the outer surfaces 110 of the mounting shoulders 105 and the inner surface 106 of the top plate 94. The top plate 94 is secured to the body 12 by fasteners 112 which extend through the top plate 94 into the mounting shoulders 105.

A closed space 114 exists between the inner surface 106 of the top plate 94 and the outer surfaces 116 and 118 of the rotor carriers 60 and 80, respectively. The closed space 114 accommodates the hanger bolt 96 and bracket 98 as well as various leads 120 (FIG. 1) for the electronic pulse output (not shown). The closed space 114 is sealed from the gas flowpath at the exit end 121 of the rotor assembly 48 by a seal ring 122 disposed between an aft-facing (i.e., facing in the downstream direction) surface 124 of the sensing rotor carrier 80 and a forward-facing (facing in the upstream direction) surface 126 of the body 12 at the downstream edge of the lateral opening 46. However, at the inlet end 127 of the rotor assembly 48, there is an axial gap 128 between a forward-facing surface 130 of the main rotor carrier 60 and an aft-facing surface 132 of the body inlet portion 24 at the lateral opening 46. Accordingly, there is fluid communication via the axial gap 128 from the entrance to the main rotor gas flowpath 64 at the exit end 30 of the body inlet portion 24 into the closed space 114. In particular, because the closed space 114 is a stagnation region (i.e., there is no gas flow through the space) and the axial gap 128 opens into the flowpath 64 in a direction generally perpendicular to the direction of gas flow, the pressure within the closed space 114 will be responsive to the static pressure existing in the flowpath 64 at the inlet end 127 of the rotor assembly 48. The axial gap 128 extends around substantially the entire circumferences of the surfaces 130 and 132, and advantageously has an axial width (measured in the gas flow direction) of about 0.01 inch to about 0.03 inch.

Figure 3:
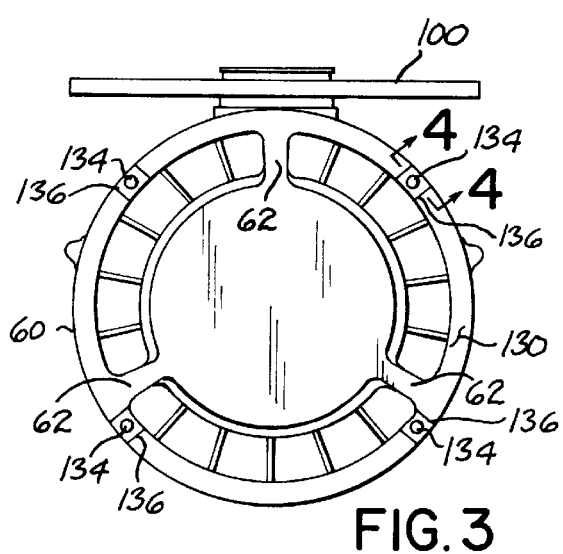
FIG. 3 is a front view of the measuring module removed from the body, showing the radial notches in the main rotor carrier and the spring-loaded ball plungers for positioning the rotor assembly with respect to the body inlet portion.
Figure 4:
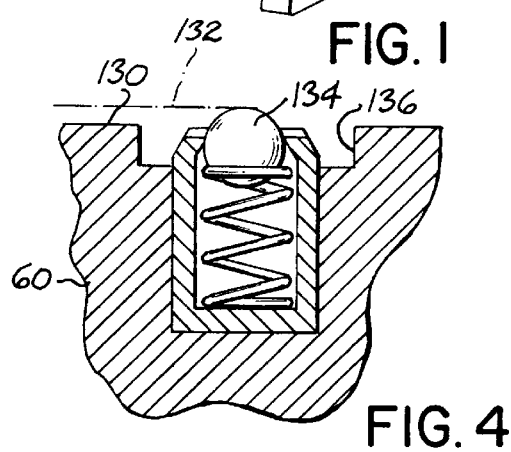
FIG. 4 is a cross-sectional view taken along line 4—4 of FIG. 3, showing a radial notch and ball plunger in further detail.

With reference to FIG. 3, the location of the main rotor carrier's forward-facing surface 130 is established relative to the aft-facing surface 132 of the body inlet portion 24 by a plurality of circumferentially spaced spring-loaded ball plungers 134 secured within the forward-facing surface 130 of the main rotor carrier 60. The ball plungers 134 engage the aft-facing surface 132 of the body inlet portion 24 to locate the rotor assembly 48 in a consistent manner with respect to the body inlet portion 24. Although FIG. 4 illustrates the ball plungers 134 as having housings which are press fit in the carrier 80, the housings may instead be threadably inserted in the carrier 80.

Because the axial gap 128 is prone to clogging by debris contained within the gas stream, and further to meet the requirements of ISO 9951 section 6.6.3.2 for reference pressure tap sizing, the meter is provided with a plurality of radially extending recesses or notches 136 in the forward-facing surface 130 of the main rotor carrier 60. With reference to FIGS. 3 and 4, the radial notches 136 advantageously surround each ball plunger 134, i.e., each ball plunger 134 is located within one of the notches 136, although additional notches not having ball plungers could also be employed. Each radial notch 136 advantageously is cut into the forward-facing surface 130 to a depth (measured in the axial direction) of from about 1/32 inch to about 1/8 inch, and has a width (measured in the circumferential direction) of from about 5/16 inch to about 9/16 inch. The radial notches 136 are less susceptible than the axial gap 128 to clogging by debris, helping to maintain proper fluid pressure communication between the gas flowpath 64 and the closed space 114 for a longer period of use. Advantageously, the radial notches 136 are used in addition to the axial gap 128, although the notches 136 could be used without the axial gap 128, or the axial gap 128 could be used without the notches 136. Furthermore, it will be appreciated that although the radial notches 136 are shown as being formed in the forward-facing surface 130 of the main rotor carrier 60, the notches could alternatively be formed in the aft-facing surface 132 of the body inlet portion 24.

The top plate 94 includes a pressure tap 138 machined through the plate from the outer surface 140 of the top plate 94 to the closed space 114. The top plate 94 is equipped with a fitting 142 for connecting a pressure sensor (not shown) of suitable range and accuracy so that the pressure within the closed space 114 may be measured. Thus, it will be appreciated that the pressure measuring system is part of the removable measuring module 44, and that the location of the pressure measurement is fixed with respect to the main rotor 50 regardless of the body in which the module is installed. This feature facilitates a high degree of repeatability of pressure measurement as well as interchangeability of meters from body to body.

It will also be appreciated that this pressure measuring system is relatively inexpensive to implement, as it does not require providing a measuring insert which includes a cylindrical inlet member and an inlet body as well as a rotor assembly, inserting the insert axially into a tube member so that an annular space is created between the inlet member and the inner wall of the tube member, sealing the annular space, and machining and finishing multiple holes through the tube member into the annular space for fluid pressure communication between the inlet flowpath and the annular space, as in prior turbine meters. Instead, the measuring module 44 includes a rotor assembly 48 separate from the inlet body 32 and with no inlet member, the module 44 being positioned in the body 12 such that the axial gap 128 exists, thereby establishing pressure communication between the main rotor flowpath 64 and the closed space 114.

In accordance with the principles of the invention, measuring the pressure in the closed space 114, instead of through a pressure tap in the main rotor carrier 60, has been found to yield a meter calibration curve which is essentially flat (i.e., meter flow error in percent is essentially constant) over a wide range of flow velocity.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A turbine meter with a pressure measuring system, comprising:

a meter body having an entrance end and a discharge end with a flow path defined therebetween and having a body inlet portion along the flow path, the body inlet portion having an exit end downstream of the meter body entrance end and directed downstream toward the meter body discharge end;

a turbine meter measuring module including a rotor assembly having an inlet end and an outlet end, the rotor assembly being mounted in the meter body along the flow path downstream of the body inlet portion with the inlet end of the rotor assembly confronting the body inlet portion exit end to define an interface therebetween such that the rotor assembly and an inner wall of the meter body radially outward of the rotor assembly define a closed space about the rotor assembly and extending downstream of the body inlet portion;

gap means defined at the interface and communicating with the closed space for coupling pressure from the interface to the closed space; and a pressure tap for measuring pressure through the meter body and opening directly into the closed space.

2. The turbine meter of claim 1, wherein the gap means comprises a circumferentially extending axial gap between the exit end of the body inlet portion and the inlet end of the rotor assembly.

3. The turbine meter of claim 1, wherein the exit end of the body inlet portion includes a circumferentially extending aft-facing surface and the inlet end of the rotor assembly includes a circumferentially extending forward-facing surface confronting the aft-facing surface, and the gap means comprises an axial gap between the aft-facing surface and the forward-facing surface.

4. The turbine meter of claim 3, wherein the gap means further comprises a plurality of radially extending notches in the forward-facing surface of the inlet end of the rotor assembly.

5. The turbine meter of claim 3, wherein the gap means further comprises a plurality of radially extending notches in the aft-facing surface of the exit end of the body inlet portion.

6. The turbine meter of claim 1, wherein the exit end of the body inlet portion includes a circumferentially extending aft-facing surface and the inlet end of the rotor assembly includes a circumferentially extending forward-facing surface confronting the aft-facing surface, and the gap means comprises radially extending notches in the forward-facing surface of the inlet end of the rotor assembly.

7. The turbine meter of claim 1, wherein the exit end of the body inlet portion includes a circumferentially extending aft-facing surface and the inlet end of the rotor assembly includes a circumferentially extending forward-facing surface confronting the aft-facing surface, and the gap means comprises radially extending notches in the aft-facing surface of the exit end of the body inlet portion.

8. The turbine meter of claim 1, wherein the inlet end of the rotor assembly further comprises a circumferentially extending forward-facing surface confronting the exit end of the body inlet portion, the forward-facing surface having a plurality of circumferentially spaced ball plungers embedded therein, each ball plunger residing within a recess formed in the forward-facing surface, wherein the gap means comprises the recesses.

9. The turbine meter of claim 1, the measuring module being removable from the meter body.

10. The turbine meter of claim 9, the body inlet portion being an integral part of the meter body so as not to be removable with the measuring module.

11. The turbine meter of claim 10 further including an inlet body in the flow path and within the body inlet portion.

12. The turbine meter of claim 11, the inlet body being rigidly attached to the body inlet portion so as not to be removable with the measuring module.

13. The turbine meter of claim 9, the meter body including a removable top plate through which to remove the measuring module.

14. The turbine meter of claim 13, the pressure tap being in the top plate.

15. The turbine meter of claim 1, the closed space being sealed from the rotor assembly outlet end.

16. The turbine meter of claim 1, the closed space being downstream of the body inlet portion.

17. The turbine meter of claim 1 further including an inlet body in the flow path and within the body inlet portion.

18. A method for measuring the pressure existing at an inlet end of a turbine rotor assembly of a gas flow meter in a meter body wherein the meter body has an entrance end and a discharge end with a flow path defined therebetween, the meter body including a body inlet portion along the flow path adjacent the entrance end of the meter body such that an exit end of the body inlet portion is directed downstream toward the discharge end of the meter body, the method comprising:

mounting the rotor assembly in the meter body along the flow path with an inlet end of the rotor assembly confronting the exit end of the body inlet portion to define an interface therebetween and with an inner wall of the meter body radially outward of the rotor assembly defining a closed space about the rotor assembly;

providing gap means at the interface such that fluid pressure at the interface is communicated to the closed space;

providing a pressure tap through the meter body and opening directly into the closed space; and measuring the pressure within the closed space via the pressure tap, thereby measuring the pressure at the interface.

19. The method of claim 18, wherein providing gap means includes providing an axial gap between the inlet end of the rotor assembly and the exit end of the body inlet portion.

20. The method of claim 18, wherein the inlet end of the rotor assembly includes a circumferentially extending surface confronting the exit end of the body inlet portion, and providing gap means includes providing radially extending notches in the surface confronting the exit end of the body inlet portion.

21. The method of claim 18, wherein the exit end of the body inlet portion has a circumferentially extending surface confronting the inlet end of the rotor assembly, and providing gap means includes providing radially extending notches in the surface confronting the inlet end of the rotor assembly.

22. The method of claim 18 further comprising removably mounting the rotor assembly in the meter body.

* * * * *